United States Patent [19]

Barlow

[11] 3,872,904
[45] Mar. 25, 1975

[54] FLEX COUPLING FASTENER
[76] Inventor: John W. Barlow, 1351 Larkin St., San Francisco, Calif. 94108
[22] Filed: Nov. 24, 1972
[21] Appl. No.: 308,981

[52] U.S. Cl. ................................ 145/50 A, 85/45
[51] Int. Cl. ..................... B25b 15/00, F16b 23/00
[58] Field of Search ............. 145/50 R, 50 A; 85/45

[56] References Cited
UNITED STATES PATENTS

| | | | |
|---|---|---|---|
| 1,908,080 | 5/1933 | Thompson | 85/45 |
| 2,046,837 | 7/1936 | Phillips | 145/50 A |
| 2,285,460 | 6/1942 | Purtell | 145/50 A |
| 2,369,852 | 2/1945 | Purtell | 145/50 A |
| 2,397,216 | 3/1946 | Stellin | 145/50 A |
| 2,556,155 | 6/1951 | Stellin | 85/45 |
| 3,213,719 | 10/1965 | Kloack | 145/50 A |
| 3,363,500 | 1/1968 | Simko | 145/50 A |
| 3,584,667 | 6/1971 | Reiland | 145/50 A |
| 3,675,694 | 7/1972 | Barlow | 145/50 A |
| R6,729 | 11/1875 | Cummings | 85/45 |

FOREIGN PATENTS OR APPLICATIONS

| | | | |
|---|---|---|---|
| 17,351 | 10/1934 | Australia | 85/45 |
| 357,468 | 9/1931 | United Kingdom | 85/45 |

Primary Examiner—Al Lawrence Smith
Assistant Examiner—J. T. Zatarga

[57] ABSTRACT

The combination with a screw containing a cone shaped base on its head of a screw driver containing beveled sections merging with angularly arranged keys on the shank thereof affording a flex coupling between the screw head and the screw driver with the angularly arranged keys of the driver removably fitting a complementary angularly arranged keyway surrounding the apex of the cone shaped base on the screw head during use and compensating for misalignment therebetween as well as reducing to a minimum the likelihood of bouncing of the blade of the driver from the head of the screw in use.

8 Claims, 12 Drawing Figures

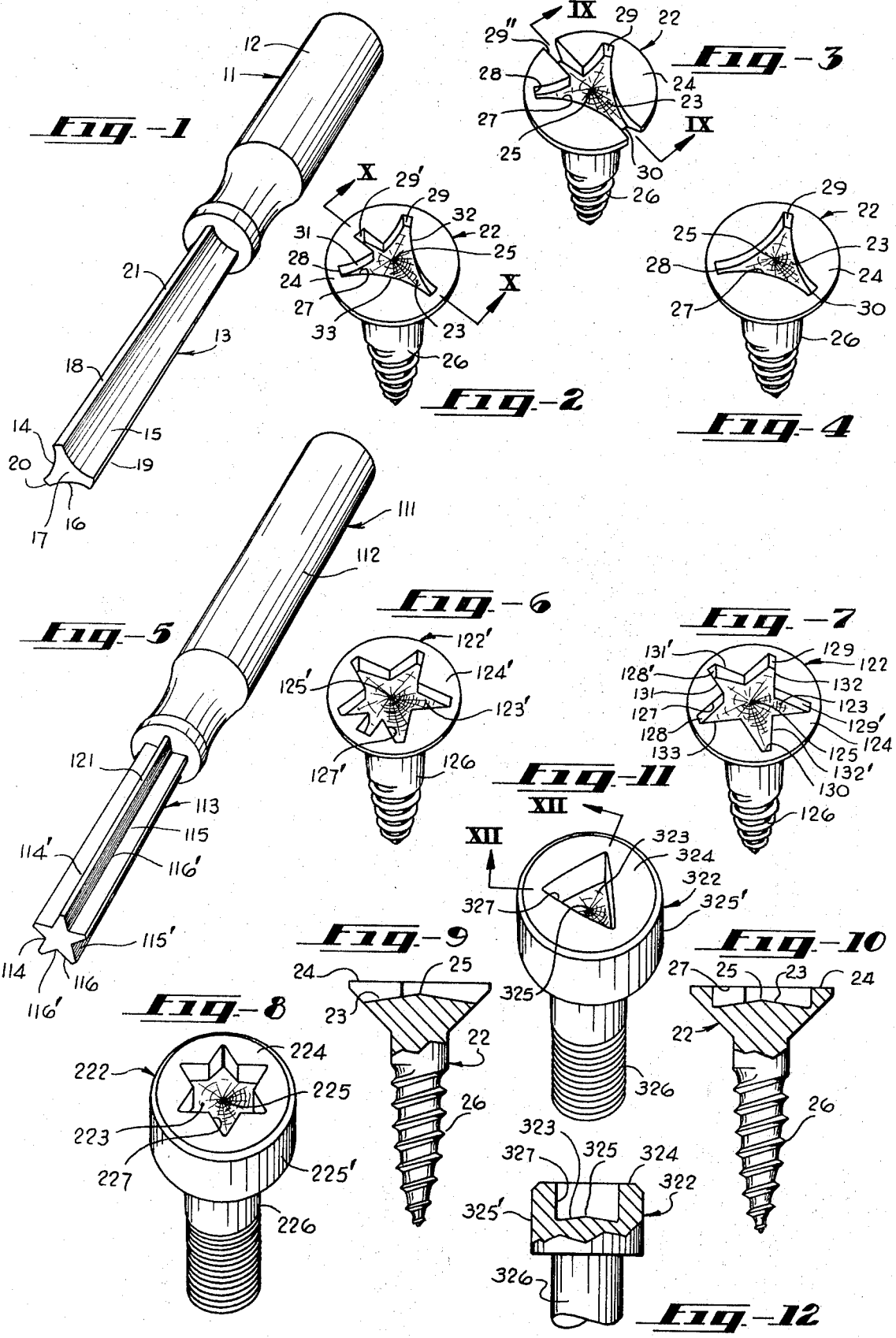

FLEX COUPLING FASTENER

The present invention relates to additional improvements in screw and screw driver combinations; this application relating to species of my prior invention disclosed and claimed in my application, Ser. No. 10,645, filed Jan. 13, 1971 which matured into U.S. Pat. No. 3,675,694, issued July 11, 1972 and entitled Screw and Screw Driver Combination.

In order to provide for heavy duty fastener applications requiring increased torque applied to a screw head to enable facile driving home of the screw into the work, I have devised the combinations illustrated in the accompanying drawings as exemplifications which are entirely suitable and efficaceous in a number of different environments.

A primary object of the present invention is to provide an improved flex coupling fastener which is capable of withstanding appreciable turning forces upon being driven home into the work as well as upon removing the same without bouncing of the screw driver from the head of the screw and affording a positive flex coupling between a screw driver and the fastener head during revolutions of the screw.

Another important object of my invention is to provide an improved flex coupling fastener of the indicated nature which is additionally characterized by its durability and longevity of use without damage to the fastener head or the driver as well as without damage to the work either when driving the fastener home or when removing the same.

A still further object of the invention is to provide an improved flex coupling fastener combination of the aforementioned character which is relatively inexpensive to manufacture and which is relatively simple to handle and manipulate.

Another object of my present invention is to provide an improved flex coupling fastener combination which lends itself admirably to power driven mechanisms applying increased torque upon the screw driver in driving the fastener home as well as removing the same under flex coupling conditions which eliminates bouncing of the driver from the fastener head.

Other objects of the invention, together with some of the advantageous features thereof, will appear from the following description of the embodiments thereof illustrated in the accompanying drawings which exemplify the best mode contemplated by me for constructing the invention and the manner of using the same. It is to be understood that the appended claims are intended to cover not only the embodiment shown but variations thereof within the purview of the invention.

Referring to the drawings:

FIG. 1 is a perspective view of the screw driver component of one embodiment of the invention.

FIG. 2 is a perspective view of the screw component of the present combination; this view showing a modified screw head containing a cross-slot to enable use of the screw with a conventional screw driver containing a short bit.

FIG. 3 is a perspective view of the screw component of the present invention; this view showing a modified screw head containing a through cross-slot to enable use of the screw with a conventional screw driver containing a long bit.

FIG. 4 is a perspective view of the screw component of the present combination for use with the screw driver component illustrated in FIG. 1.

FIG. 5 is a perspective view of the screw driver component of a modified mebodiment of my present invention.

FIG. 6 is a perspective view of a screw component usable with the screw driver component of FIG. 5, as well as usable with a standard screw driver containing a straight bit on the blade thereof.

FIG. 7 is a perspective view of a screw component removably receiving in flex coupling a screw driver component of FIG. 5.

FIG. 8 is a perspective view of a modified screw component of my present invention in a flex coupling fastener, this modification being usable with a socket type screw driver component mounted on a rotatable shaft.

FIG. 9 is a sectional elevational view of the modified screw component shown in FIG. 3 and taken on the line IX—IX thereof.

FIG. 10 is a sectional elevational view of the modified screw component shown in FIG. 2 and taken on the line X—X thereof.

FIG. 11 is a perspective view of still another modified embodiment of a screw component of the socket type usable with a power driven socket type screw driver having a triangular shaped shank thereon.

FIG. 12 is a sectional elevational view of the screw component shown in FIG. 11 and taken on the line XII—XII thereof.

In its preferred form, the flex coupling fastener of my present invention preferably comprises, in combination with a screw component containing a cone-shaped base on its head having an angular shaped recess therein surrounding the apex of the cone-shaped base and terminating in a plurality of key-ways merging with one another, a screw driver component removably fitting said recess of said screw component during use for removably seating the same in any work; said screw driver component containing beveled sections merging with angularly arranged key on the shank thereof for flex coupling with said recess and key-ways in the head of said screw component.

A modified embodiment of my present invention preferably comprises the screw and screw driver components of my preferred embodiment hereinabove described, and a straight cross-slot in the head of said screw component for receiving the straight bit of a conventional screw driver blade; said cross-slot overlying the apex of said cone-shaped base of the head of said screw component and being confined within the bounding rim of the head.

Another modified embodiment of the present invention preferably comprises the screw and screw driver components of my above described preferred embodiment, and a straight cross-slot in the head of the screw component for receiving the straight bit on the blade of a standard screw driver; said straight cross-slot overlying the apex of the one-shaped base of the head of said screw component and extending at both sides through the bounding rim of the head.

A still further modification of the invention preferably comprises the screw and screw driver components of my above described preferred embodiment; and an annular depending flange on the head of said screw component for reception in the socket of a driven member secured to said screw driver component.

Aanother modification of my flex coupling fastener preferably comprises a screw component containing a flanged socket type head thereon which contains a cone-shaped base and, a straight walled angular keyway therein for removably receiving a screw driver component containing a complementary keyed blade for flex coupling with said key-way of the flanged head of said screw component during use in removably seating the screw component in any work.

As particularly illustrated in FIGS. 1 and 4 of the annexed drawings, I provide in my flex coupling fastener a screw driver component which is generally designated by the reference numeral 11 and which comprises a handle 12 and a connected shank or blade generally designated by the reference numeral 13. The blade 13 is specially constructed so as to provide thereon a plurality of beveled sections 14, 15 and 16 extending from the outer tip 17 thereof to the handle 12. As shown, the sections 14, 15 and 16 terminate in keys 18, 19 and 20 arranged in spaced relationship to one another but merging with one another through the beveled sections. In the embodiments illustrated in FIG. 1, the keys are triangularly arranged. While the keys 18, 19 and 20 are illustrated as being flat on their outer surfaces 21 and extend the full length of the blade 13, it is within the purview of the present invention that such outer surfaces 21 can be rounded or can be extended to points, as desired.

In accordance with the present invention of my flex coupling fastener, I also provide for combining use with the screw driver component 11 a screw component which is generally designated by the reference numeral 22 and which is fashioned with a cone-shaped base 23 on the head 24 thereof with the apex 25 of the cone-shaped base at the center of the flat circular head 24 as illustrated in FIG. 4 of the annexed drawings. Up to this point, the description of the screw component 22 which, of course, is formed with an integral threaded shank 26 corresponds to the description of the screw component 21 of my screw and screw driver combination described, illustrated and claimed in my aforesaid U.S. Pat. No. 3,675,694 issued July 11, 1972. However, in the present invention, I provide a head 24 on the screw somponent 22 which is formed with an angular-shaped recess 27 therein surrounding the apex 25 of the cone-shaped base of the head and defining a plurality of key-ways 28, 29 and 30 which merge with one another through the arcuate walls 31, 32 and 33 of the recess 27, which traverse the radially extending sections of said base 23. Such fashioned recess 27 is complementary to the configuration of blade or shank 13 of the screw driver component 11 so that in use the beveled sections 14, 15 and 16 of the blade engage the arcuate walls 31, 32 and 33 of recess 27 in the head 24 of the screw component 22 with the keys 18, 19 and 20 of the blade fitting the key-ways 28, 29 and 30 of the recess 27 in the head of the screw component in flex coupling combination by virtue of the opposed sloping radial sections of conical base 23 upon driving the screw component home in a work, as well as in removing the screw component from a work whenever desired.

The construction of the screw components 22 illustrated in FIGS. 2 and 3 of the annexed drawings is substantially the same as the construction of the screw component 22 illustrated in FIG. 4. However, the modified embodiment of screw component 22 shown in FIG. 2 is conveniently formed with a staight cross-slot 29' which extends through the arcuate wall 31 of the formed recess 27 and terminates in the key-way 30 of such recess; it being noted that the cross-slot 29' is confined within the bounding rim of the circular head 24. Moreover, in constructing the modification of FIG. 3, there is no deviation from the screw component 22 of FIG. 4 other than the provision of a through straight cross-slot 29'' which extends completely across the head 24 and through the bounding rim thereof, the cross-slot 29'' interrupting the arcuate wall 31 of recess 27 and extending through the key 30 thereof, as shown. Thus, the flex coupling fastener can be used to drive the screw component 22 home into a work by employing a conventional screw driver with a short bit, not shown, in the case of a screw component illustrated in FIG. 2 of a standard screw driveir with a long bit, also not shown, in the case of a screw component 22 of the type shown in FIG. 3. The slots 29 and 29' extend downwardly from the apex 25 of the conical base 23 thus affording flex coupling with the bit of a screw driver.

In FIGS. 5 and 7 of the annexed drawings I have illustrated my improved flex coupling fastener in a screw driver component generally designated by the reference numeral 111 provided with a handle 112 and an integral shank or blade generally designated by the reference numeral 113 for combining in flex coupling drive with a screw component, generally designated by the reference numeral 122. It is to be observed that in this modification, the angularly-shaped shank 113 of the screw driver component 111 is in the form of a star rather than in the form of a triangle as in the case of the embodiment illustrated in FIG. 1 of the annexed drawings. As shown, the blade 113 comprises five sharp beveled sections 114, 114', 115, 115' and 116 extending from the tip 117 of the shank to the haandle 112 and defining five keys 118, 118', 119, 119' and 120. The beveled sections of the blade 113 of screw driver component are so formed as to provide an inset medial divider line 116' in each of the beveled sections 114, 114', 115, 115' and 116 to afford definite and predetermined pitch to each of the keys. Again, while the outer surfaces, indicated at 121, of the keys 118, 119 and 120 are shown flat throughout, these outer surfaces can be formed to points or rounded, as desired.

With reference to FIG. 7, the screw component 122 is fashioned with a cone-shaped base 123 on a flat head 124 with the apex 125 of the cone-shaped base; the screw component including a conventional threaded shank 126. Moreover, the screw component 122 is so formed as to provide a generally star-shaped recess 127 in the head 124 thereof, which recess is complementary to and serves to receive the outer extremity of the star-shaped blade 113 of the screw driver 111 when in flex coupled use in driving the screw component home into a work as well as in removing the screw component 122 from the work when desired. It is to be noted that the recess 127 symmetrically surrounds the apex 125 of the cone-shaped base and defines key-ways 128, 128', 129, 129' and 130 into which the keys 118, 118', 119, 119' and 120 of the blade 113 of screw driver component 111 are fitted with the beveled blade abutting the divided defined walls 131, 131', 132, 132', and 133 of recess 127 in flex coupling combination when in use.

In FIG. 6 of the annexed drawings, I have illustrated a modified embodiment of a screw component which is designated generally by the reference numeral 122' and which differs from the star-shaped embodiment shown in FIG. 7 only in respect to the inclusion of an additional key-way therein in that it is six-pointed rather than five pointed. This six key-way screw component is usable in flex coupling with a screw driver containing a six-keyed shank, not shown, similar to the five-keyed shank 113 of the screw driver component 111 shown in FIG. 5. Thus, the modification of FIG. 6 is fashioned with a cone-shaped base 123' on a flat head 124' with the apex 125' of the cone-shaped base located at the center of the head, and includes an integral threaded shank 126'. The modification also is formed with a star-shaped recess 127' defining six key-ways, as shown, which are complementary to the six keys on the particular screw driver blade not shown, with which the modified embodiment is combined in flex coupling for driving the screw component 122' into a work.

I have also provided a screw component 222, see FIG. 8 which also is fashioned with cone-shaped base 223 on a head 224 with the apex 225 of the cone-shaped base at the center of the head. In the modified embodiment of FIG. 8, I so form the head 224 as to provide a deep annular depending flange 225' thereon in order that the head of the screw component can fit the socket of a driven member, all not shown, whereby the screw component may be manually or power driven into a work or removed therefrom by the turning of the threaded shank 226 thereof by means of a specially constructed shank on the driven member formed with six keys thereon, all not shown, fitting into the six key-ways provided in the head 224 by forming of a six star-shaped recess 227 in the head, as shown.

In accordance with the present invention in a flex coupling fastener, I also provide another socket-type screw component 322, see FIGS. 11 and 12, wherein I provide a cone-shaped base 323 on the head 324 thereof with the apex 325 disposed at the center of the head and with the head fashioned with a deep depending annular flange 325' capable of fitting the socket of a driven member, all not shown. The screw component 322 is provided with a shank 326 in which threads are formed in spaced circumferential series, as shown; it being understood that the threads can be arranged spirally on the shank as with the other illustrated embodiments. In the modified screw component 322, I provide a deep triangular-shaped recess 327 therein rather than a star-shaped or other angular shaped recess, and such modified screw component 322 can be used in combination with a screw driver component, not shown, provided with a triagnular-shaped shank thereon wherein the sections of the shank between the three points of the triangle are straight rather than beveled as in the cases of the exemplifications of my invention illustrated in FIGS. 1 and 5 of the annexed drawings. When used in flex coupling combination, a portion of the extremity of the triangular-shaped shank of the screw driver component, all not shown, will be fitted into the triangular-shaped recess 327 of the screw component 322 to effectively drive the screw component home into the work without dislodgement or bouncing of the screw driver component from the screw component, as well as to effectively remove the screw component from the work without damaging the work or without damaging either the screw driver component or the screw component, by virtue of the flex coupling therebetween, as in the case of prior art screw and screw driver combinations.

It is to be noted that my improved flex coupling fastener can be operated efficaceously either manually or with applied power at high speeds, and that the invention is not limited by any special recesses formed in the head of the screw component and the screw driver except, of course, that the shaped angular recesses in the heads of the screw components are to be complementary to the shaped angular shanks of the screw driver component used in combination, as indicated by the appended claims.

The flex coupling fastener of my present invention possesses the dual functional features of not only affording a flex coupling between the screw head and the blade or shank of the specially constructed screw driver to eliminate the bouncing of the screw driver from the angularly shaped recess surrounding the apex of the cone-shaped base of the screw head when in use, but also of affording the application of an appreciably increased torque, whether applied manually or whether power applied, without damage to the shank of the screw driver blade and without burring of the bounding wall of the angular recess in the screw. Thus, I have provided in my improved flex coupling fastener a combination which is durable and having increased longevity; it being capable of withstanding high applied pressure at high speeds because of the gear-like coupling between the complementary components of the screw head and screw driver.

I claim:

1. A flex coupling fastener comprising, in combination with a screw driver consisting of a shank, a plurality of angularly shaped keys on said shank arranged successively about the perimeter thereof, a screw comprising a head, a flat top on said head, a threaded shank extending in the axial direction of the screw; said head having an angularly shaped recess therein extending into a free face of said flat top of said head, a cone-shaped base on said head having its apex substantially parallel to the axis of the screw and the apex being the highest point of the bottom of said recess which surrounds said apex to comprise a key-way complementary to said keys on the shank of said screw driver whereby said keys on said shank of said screw driver are adapted to be removably fitted into said recess in said head of said screw to effect flex coupling therebetween during engagement and rotation of said screw by said screw driver in driving the screw into a work and in removing the screw therefrom.

2. A flex coupling fastener as set forth in claim 1 wherein said keys on said shank of said screw driver are arranged in the form of a star and wherein the sections of said shank between said keys are straight and extended toward the axis of said shank to define said keys, and wherein said angular recess in said head of said screw is star-shaped defining key-ways complementary to said keys on said shank of said screw driver; and straight walls bounding said star-shaped recess of said head of said screw for effecting removable fitting of said shank of said screw driver thereto in flex coupling engagement during rotation of said screw by said screw driver in driving said screw into a work and in removing the same from the work.

3. A flex coupling fastener as set forth in claim 2, and a depending annular flange on said head and said screw to enable said screw to be fitted to a socket of a driven member for power driving said screw into a work by the driven member and in removing the same from the work upon reverse rotation of the driven member.

4. A flex coupling fastener as set forth in claim 1 wherein said shank of said screw driver is triangular in shape with flat sections between the tips of the traingle, and wherein said recess in said head of said screw is triangular in shape, and straight walls bounding said recess and joining the tips of said triangular recess complementary to the flat sections of said shank of said screw driver for effecting removable fitting of said triangular shaped flat sectioned shank of said screw driver into said triangular shaped straight bounding walled recess of said head of said screw when rotating said screw to drive the same into a work and in removing the same from the work.

5. A flex coupling fastener as set forth in claim 4, and a depending annular flange on said head of said screw to enable said screw to be fitted to a socket of a driven member for power driving said screw into a work and removing the same from the work upon reverse rotation of the driven member.

6. A flex coupling fastener as set forth in claim 1 wherein said keys on said shank of said screw driver are triangularly arranged thereon with bevelled sections therebetween, and wherein said recess in said head of said screw is triangular in shape, and arcuate walls bounding said recess complementary to said bevelled sections on the shank of said screw driver; said arcuate walls traversing radial sections of said cone-shaped base extending downwardly from the apex thereof and affording gear-like coupling in use.

7. A flex coupling fastener as set forth in claim 6 and a cross-slot in said head of said screw for receiving in flex coupling the bit of a screw driver; said cross-slot being downwardly inclined from said apex of said cone-shaped base outwardly toward the rim of said head of said screw.

8. A flex coupling fastener as set forth in claim 6, and a depending annular flange on said head of said screw to enable said screw to be fitted to a socket of a driven member for power driving screw into a work by the driven member and in in removing the same from the work upon reverse rotation of the driven member.

* * * * *